United States Patent
Abraham et al.

(10) Patent No.: US 8,512,444 B2
(45) Date of Patent: Aug. 20, 2013

(54) HOT GAS PURIFICATION

(75) Inventors: Ralf Abraham, Bergkamen (DE);
Michael Rieger, Dortmund (DE);
Domenico Pavone, Bochum (DE); **Olaf
Von Morstein**, Essen (DE)

(73) Assignee: ThyssenKrupp Uhde GmbH,
Dortmund (DE)

( * ) Notice: Subject to any disclaimer, the term of this
patent is extended or adjusted under 35
U.S.C. 154(b) by 234 days.

(21) Appl. No.: 12/998,236

(22) PCT Filed: Sep. 9, 2009

(86) PCT No.: PCT/EP2009/006532
§ 371 (c)(1),
(2), (4) Date: Mar. 29, 2011

(87) PCT Pub. No.: WO2010/037465
PCT Pub. Date: Apr. 8, 2010

(65) Prior Publication Data
US 2011/0173886 A1    Jul. 21, 2011

(30) Foreign Application Priority Data
Sep. 30, 2008  (DE) .................. 10 2008 049 579

(51) Int. Cl.
*B01D 53/02*      (2006.01)
*C10J 3/72*       (2006.01)

(52) U.S. Cl.
USPC ............... 95/107; 95/132; 95/135; 95/136;
95/137; 96/108; 48/128; 48/197 R

(58) Field of Classification Search
USPC ............. 95/107, 132, 135, 136, 137; 48/128,
48/197 R; 96/108
See application file for complete search history.

(56) References Cited

U.S. PATENT DOCUMENTS

| | | | |
|---|---|---|---|
| 4,752,308 A | 6/1988 | Brandl et al. | |
| 4,880,439 A | 11/1989 | Najjar et al. | |
| 4,959,080 A | 9/1990 | Sternling | |
| 5,403,366 A | 4/1995 | Leininger et al. | |

FOREIGN PATENT DOCUMENTS

| | | |
|---|---|---|
| DE | 35 31 918 | 3/1987 |
| DE | 35 37 493 | 4/1987 |
| DE | 690 03 183 | 1/1994 |
| DE | 42 38 934 | 5/1994 |

(Continued)

OTHER PUBLICATIONS

Translatioin of DE 3531918 A1. Mar. 19, 1987, Firnhaber.*

(Continued)

*Primary Examiner* — Christopher P Jones
(74) *Attorney, Agent, or Firm* — Collard & Roe, P.C.

(57) ABSTRACT

With a method and a system for treatment of a hot crude gas generated by an entrained flow gasification system, removal of the compounds that contain sulfur and carbon is supposed to be undertaken in such a manner that hot gas is made available for further use. This is achieved in that a desulfurization (7) follows the gasifier (2), in series, in the flow path of the hot gas, followed by a solid separation (8, 9), whereby behind the solid separation (8, 9), a partial stream (13) of the gas is provided downstream by way of a water quench (14), a Venturi scrubber (15), a crude gas cooler (16), as well as an $H_2O$ separation (17) and a compressor (18), the flow path (19) of which is passed back, cooled, into the circuit, behind the gasification (2) and ahead of the desulfurization system.

15 Claims, 2 Drawing Sheets

(56) References Cited

FOREIGN PATENT DOCUMENTS

Figure 1:
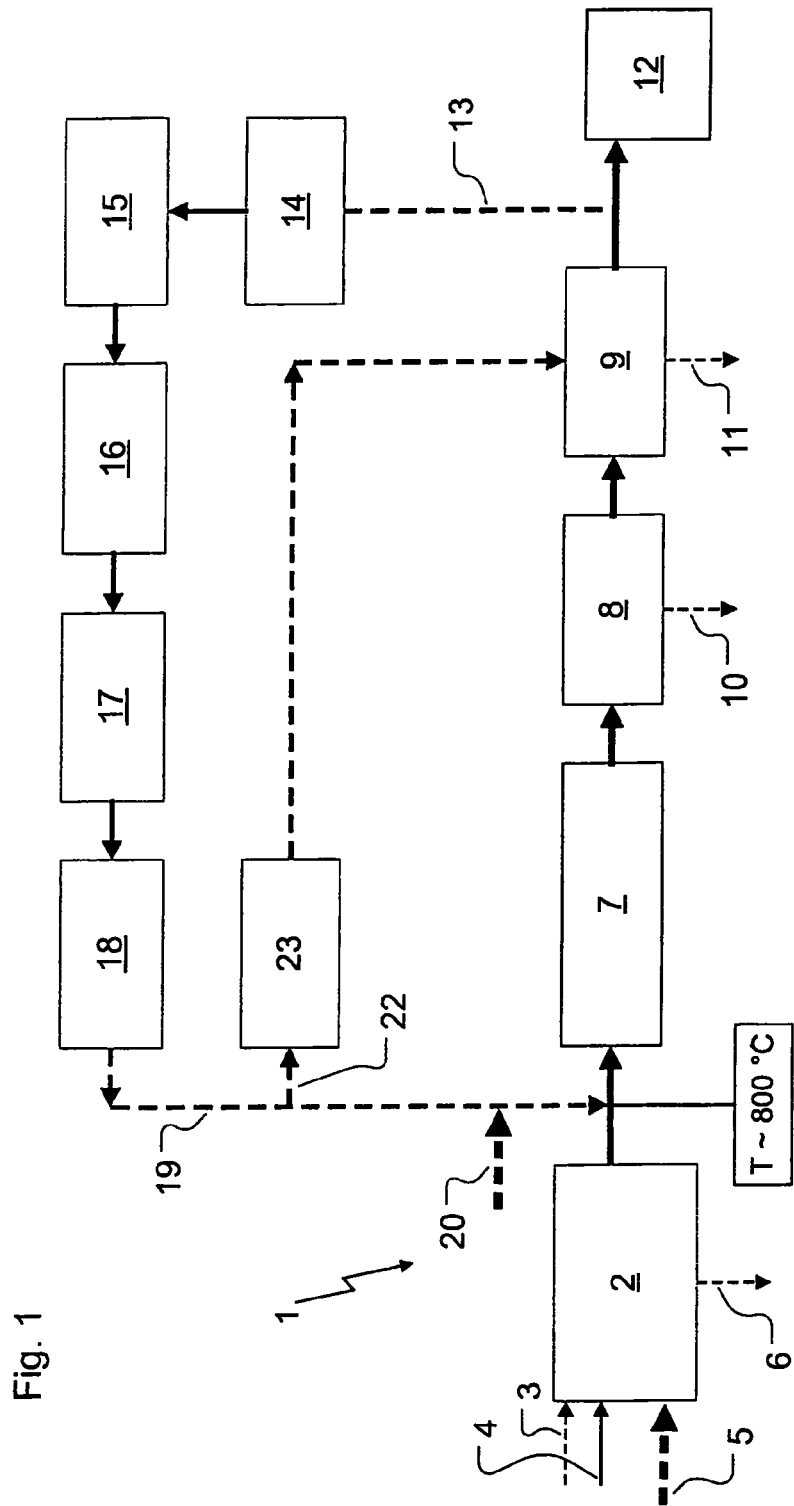

| | | |
|---|---|---|
| DE | 43 17 319 | 12/1994 |
| EP | 0 310 584 | 4/1989 |
| GB | 2 180 849 | 4/1987 |

OTHER PUBLICATIONS

International Search Report, Apr. 2011.

* cited by examiner

HOT GAS PURIFICATION

CROSS REFERENCE TO RELATED APPLICATIONS

This application is the National Stage of PCT/EP2009/006532 filed on Sep. 9, 2009, which claims priority under 35 U.S.C. §119 of German Application No. 10 2008 049 579.4 filed on Sep. 30, 2008, the disclosure of which is incorporated by reference. The international application under PCT article 21(2) was not published in English.

The invention is directed at a method and a system for treatment of a hot crude gas generated by an entrained flow gasification system.

A problem in the entrained flow gasification of carbonaceous fuels (coal, biomass, residues from chemical systems, Orimulsion, or the like) is that downstream system components are exposed to corrosive attack by hydrogen chloride and hydrogen sulfide. Accordingly, efforts are being made'to massively reduce the concentrations of hydrogen chloride and hydrogen sulfide.

Up to now, the removal of hydrogen chloride or hydrogen sulfide has predominantly been carried out in the cold range, with wet methods using suitable agents or detergents. It is disadvantageous in connection with the methods in the cold gas range that the gas must be cooled for gas purification. This results in significant losses in the degree of efficiency and in a high level of technical effort.

From an energy and economics aspect, it is desirable, in the case of some processes, to carry out removal of the gas components that contain chlorine and sulfur in the high-temperature range, if at all possible, in order to avoid cooling. In this way, the hot gas can be passed on to direct iron reduction, for example, without cooling. Improvements in the degree of efficiency can also be achieved, for example, if the reduction gas is directly passed on to the gas turbine, without greater cooling. It is possible to transfer this method of procedure to other processes, as well.

The treatment of crude gases is known in various configurations. Only as an example, reference is made to DE 35 37 493 A1 of the applicant, or to DE 35 31 918 A1, DE 42 38 934 C2, DE 43 17 319 B4, or DE 690 03 183 T3 from among the great number of other publications.

For the above reasons, the task of the invention therefore consists in undertaking removal of the compounds that contain sulfur and carbon, in such a manner that hot gas is made available for further use.

This task is accomplished, according to the invention, with a method of the type indicated initially, in that the hot crude gas, hotter than 600° C., is passed to desulfurization and to HCl removal, whereby subsequently, a partial stream is removed to form a quenching gas cooling stream, and after cooling, micro-dust removal, drying, and compression, passed back to the hot crude gas stream behind the entrained flow gasifier.

In an entrained flow gasifier, temperatures between 1200 and 1600° occur in the reaction zone. In this temperature range, the remaining slag particles are liquid and/or tacky, and must therefore be converted to a solid state, in order to avoid contamination. In order to prevent deposits or blockages in downstream system parts, and to utilize the advantage of the removal of compounds that contain chlorine or sulfur, using absorbents in an ideal temperature window, it is practical to cool the hot reduction gas with recirculated crude gas from the gasification process.

Recirculated crude gas for cooling comes from the quenching gas process, where it is cooled and freed of dust, among other things. In the quenching gas process, a partial stream of the crude gas is cooled with water, in the water quench, and partly freed of HCl. The cooled crude gas, which is lower in HCl, must furthermore be freed of micro-dust. A Venturi scrubber is used for micro-dust removal. The cooled crude gas, freed of residual dust, still contains water. The water present in the crude gas must still be condensed out. For this purpose, the crude gas is cooled by way of heat exchanger surfaces, and the condensing water is removed by way of separators. The crude gas must still be compressed to gasification pressure by means of crude gas compressors.

After compression, absorbent can still be introduced into the crude gas stream. Cooled, compressed crude gas can now be used to cool the crude gas stream from the reaction zone of the gasification process. Furthermore, it is advantageous to use the quenching gas stream that is obtained, after further compression, for combined cleaning of filter elements for retention of dust and compounds that contain sulfur.

An advantage of the method of procedure according to the invention consists in that overly great cooling of this gas is avoided, and in this connection, optimal control of the method of procedure according to the invention is possible with the recirculation of a partial stream.

Embodiments of the invention are evident from the dependent claims. In this connection, it can be provided, for example, that absorbents are passed to the hot crude gas for desulfurization and/or HCl removal.

These absorbents can be, for example, calcium oxide or limestone, but also calcium carbonate, calcium hydroxide, or also iron ore. A further embodiment of the invention consists in that the absorbents (additives) are added to the recirculated quenching gas stream and/or to the entrained flow gasifier and/or to the fuel and/or before dust removal and/or after dust removal. In this connection, the addition of such absorbents or the location of addition is generally determined by the type of system used and/or the additive used.

An advantageous embodiment of the invention consists in that the branched-off quenching gas stream is passed over a water quench, a Venturi scrubber, a crude gas cooling, an $H_2O$ removal, and a crude gas compression before being fed into the generated hot crude gas, whereby it can also be provided that part of the recirculated quenching gas stream is passed to a cartridge filter as cleaning gas, by way of another crude gas compression.

Another embodiment of the invention advantageously consists also in that the generated hot crude gas stream is purified by way of a cyclone and/or a cartridge filter, whereby the cyclone and/or a cartridge filter is/are positioned ahead of or behind the desulfurization.

In order to configure the method according to the invention to be particularly efficient, it can be provided that calcium oxide or limestone is used as an absorption agent, which is replaced after its separation capacity has decreased, or regenerated by means of flue gases enriched with steam, and/or that other absorption agents, such as iron ore or the like, are used.

The invention also provides for a system for implementing the method which is characterized in that a desulfurization follows the gasifier, in series, in the flow path of the hot gas, followed by a solid separation, whereby behind the solid separation, a partial stream of the gas is provided downstream by way of a water quench, a Venturi scrubber, a crude gas cooler, as well as an $H_2O$ separation and a compressor, the flow path of which is passed back, cooled, into the circuit, behind the gasification and ahead of the desulfurization system.

A slightly modified system configuration consists, according to the invention, in that a solid separation follows the gasifier, in series, in the flow path of the hot gas, followed by the desulfurization and another solid separation, whereby behind the solid separation, a partial stream of the gas is provided downstream by way of a water quench, a Venturi scrubber, a crude gas cooler, as well as an H₂O separation and a compressor, the flow path of which is passed back, cooled, into the circuit, behind the gasification and ahead of the desulfurization system.

Another advantageous embodiment consists in that a further partial stream is removed from the cooled partial gas stream ahead of the feed line to the main gas stream, with a gas compressor that cleans a solid separator in the main gas stream, configured as a cartridge filter.

In this connection, it can be advantageous if the gasifier has not only fuel and oxygen but also an additive feed assigned to it and/or if an additive feed is assigned to the return line of the cooled partial gas stream.

An additive feed can also be provided between the cyclone and the desulfurization, in the modified system configuration.

Figure 2:
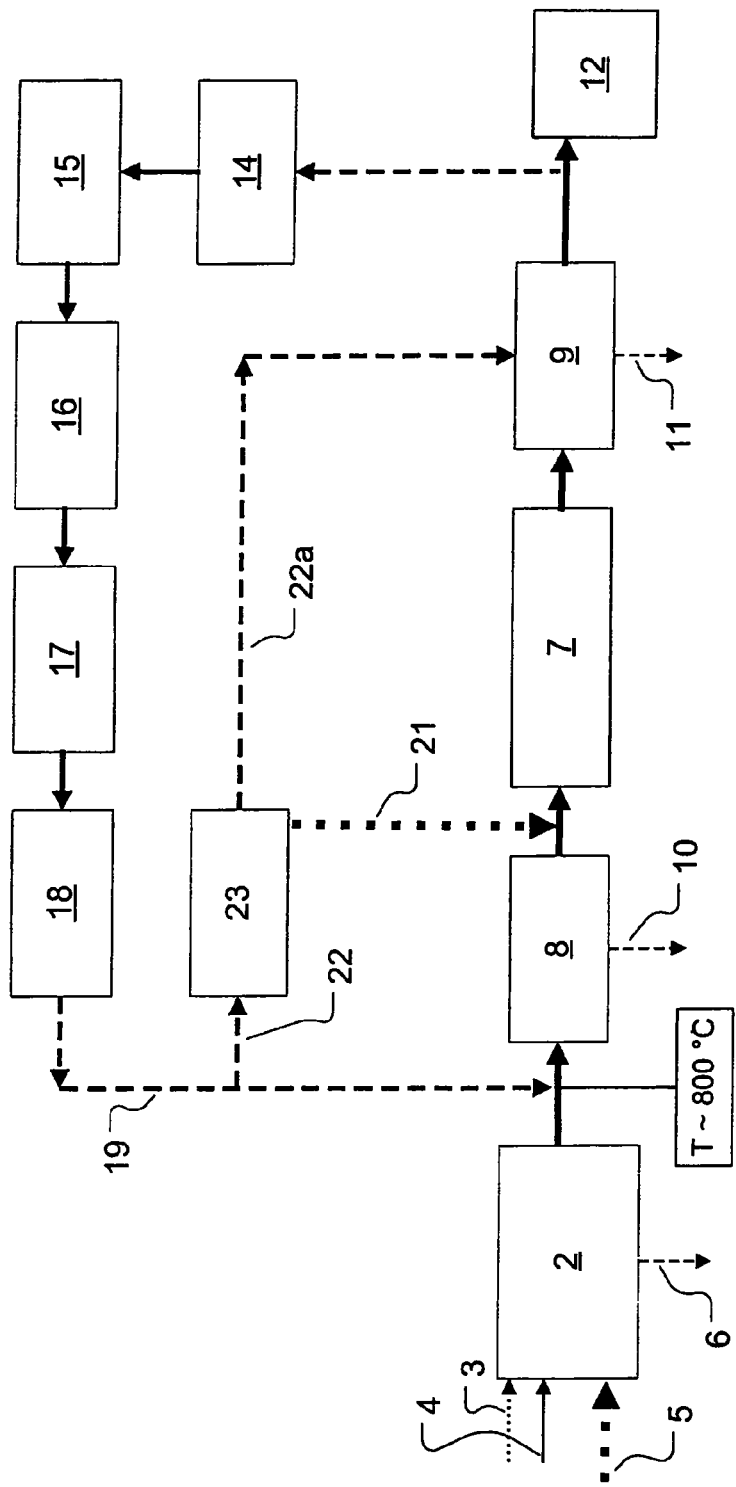

Further characteristics, details, and advantages of the invention are evident from the following description and using the drawing. This shows:

FIG. 1 a fundamental schematic of a system for carrying out the method according to the invention, and in FIG. 2 a modified fundamental schematic.

Making reference to FIG. 1, the system according to the invention, designated in general with 1, has a gasifier 2, whereby the fuel 3, oxygen 4, and, if necessary, an additive 5 are supplied to the gasifier 2, as is only indicated symbolically in the figures. As indicated by a broken-line arrow, slag 6 exits from the gasifier.

The gas that leaves the gasifier at a temperature of 1200 to 1600° C. is cooled to approximately 800° C. with the quenching gas stream 19, and passed to the desulfurization device, this in turn acts, in the course of the gas feed, on a cyclone designated with 8 and a cartridge filter 9; the dust discharge or the discharge of used additive is shown with a broken line in these system parts and designated with 10 and 11.

Finally, the hot useful gas leaves the system; this is indicated with a box symbol 12.

Behind the cartridge filter 9, a line 13 is indicated, by way of which part of the hot gas is passed to a water quench 14, from there to a Venturi scrubber 15, finally to a crude gas cooling 16, followed by an H₂O separation 17, a crude gas compression 18, whereby the partial gas stream compressed and cooled in this way is passed to the main gas stream between gasifier 2 and desulfurization device 7, by way of a line 19, for regulation of the temperature.

Finally, it is also indicated in FIG. 1 that an additive can be added at this last location of the line 19, as is indicated with a dotted arrow 20.

In the exemplary embodiment according to FIG. 2, the difference essentially consists in that first, a solid separator configured as a cyclone 8 follows the gasifier 2, and is then followed by the desulfurization 7, whereby all the other system elements in FIG. 2 have the same reference symbol as in FIG. 1. The one possibility of adding additives is furthermore represented with the dotted arrow 21 in FIG. 2, whereby the feed is undertaken here between the cyclone 8 and the desulfurization device 7.

Both circuits have in common that once again, a partial stream of the recirculated cooled gas can be supplied to a crude gas compressor 23 by way of a line 22, making a cleaning gas for the cartridge filter 9, for example, available, as is reproduced with the broken line 22a.

Reference Symbol List:
1 system
2 gasifier
3 fuel feed
4 oxygen addition
5 additive addition
6 slag withdrawal
7 desulfurization
8 cyclone
9 cartridge filter
10 solid discharge
11 solid discharge
12 useful gas
13 line
14 water quench
15 Venturi scrubber
16 crude gas cooling
17 H₂O removal
18 crude gas compression
19 line
20 additive addition
21 additive addition
22 line
22a line
23 crude gas compressor

The invention claimed is:

1. Method for treatment of a hot crude gas generated by an entrained flow gasification system comprising an entrained flow gasifier, wherein the hot crude gas, hotter than 600° C., is passed to desulfurization and to HCl removal, whereby subsequently, a partial stream is removed to form a quenching gas cooling stream, and after cooling, micro-dust removal, drying, and compression, passed back to the hot crude gas stream behind the entrained flow gasifier.

2. Method according to claim 1, wherein absorbents are passed to the hot crude gas for desulfurization and/or HCl removal.

3. Method according to claim 1, wherein the absorbents (additives) are added to the quenching gas stream and/or to the entrained flow gasifier and/or to fuel supplied to the entrained flow gasifier and/or before dust removal and/or after dust removal.

4. Method according to claim 3, wherein the branched-off quenching gas stream is passed to the hot crude gas by way of a water quench, a Venturi scrubber, a crude gas cooling, an H₂O removal, and a crude gas compression.

5. Method according to claim 4, wherein part of the quenching gas stream is passed to a cartridge filter as cleaning gas, by way of another crude gas compression.

6. Method according to claim 5, wherein the generated hot crude gas stream is purified by way of a cyclone and/or a cartridge filter, whereby the cyclone and/or a cartridge filter is/are positioned ahead of or behind the desulfurization.

7. Method according to claim 6, wherein calcium oxide or limestone is used as an absorption agent, which is replaced after its separation capacity has decreased, or regenerated by means of flue gases enriched with steam.

8. Method according to claim 7, wherein other absorption agents are used.

9. Method according to claim 3, wherein an additive feed is added to the hot crude gas stream between a solid separator, configured as a cyclone, and the desulfurization system.

10. System for implementing the method according to claim 1, wherein a desulfurization follows the gasifier, in series, in the flow path of the hot gas, followed by a solid separation, whereby behind the solid separation, a partial stream of the gas is provided downstream by way of a water quench, a Venturi scrubber, a crude gas cooler, as well as an $H_2O$ separation and a compressor, the flow path of which is passed back, cooled, into the circuit, behind the gasification and ahead of the desulfurization system.

11. System according to claim 10, wherein a further partial stream is removed from the cooled partial gas stream ahead of the feed line to the main gas stream, with a gas compressor that cleans a solid separator in the main gas stream, configured as a cartridge filter.

12. System according to claim 11, wherein not only fuel and oxygen but also an additive feed are assigned to the gasifier.

13. System according to claim 10, wherein an additive feed is assigned to the return line of the cooled partial gas stream.

14. System according to claim 10, wherein an additive feed is provided between solid separator, configured as a cyclone, and the desulfurization system.

15. System for implementing the method according to claim 1, wherein a solid separation follows the gasifier, in series, in the flow path of the hot gas, followed by the desulfurization and another solid separation, whereby, behind the solid separation , a partial stream of the gas is provided downstream by way of a water quench, a Venturi scrubber, a crude gas cooler, as well as an $H_2O$ separation and a compressor, the flow path of which is passed back, cooled, into the circuit, behind the gasification and ahead of the desulfurization system.

* * * * *